Mar. 27, 1923.
B. C. ZUHARS ET AL
POWER TAKE-OFF
Filed Feb. 6, 1920
1,449,572
6 sheets-sheet 2
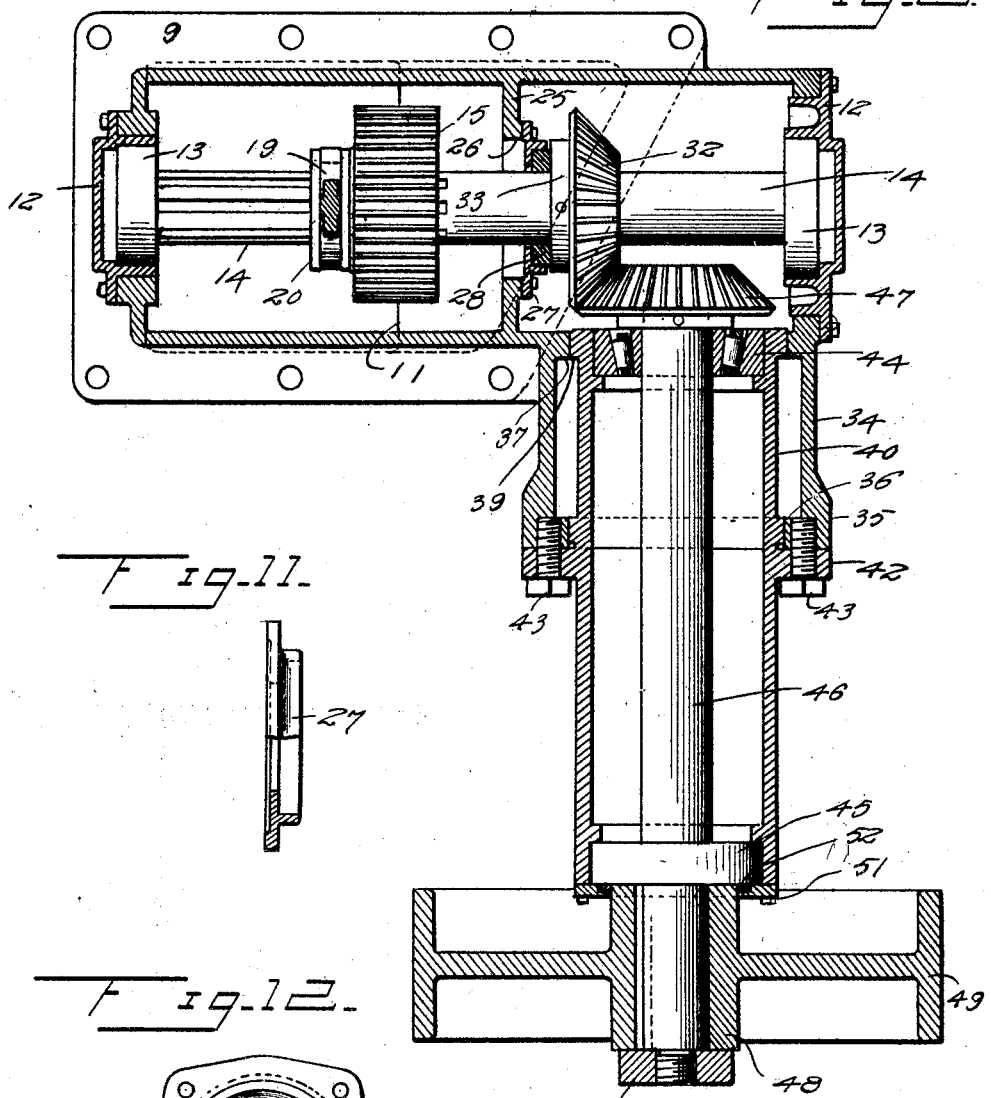
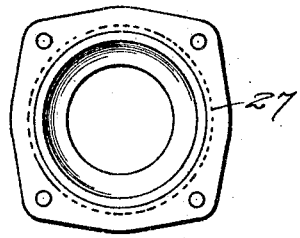
Inventors
B.C. Zuhars
H.D. Clarke
By ........ Atty

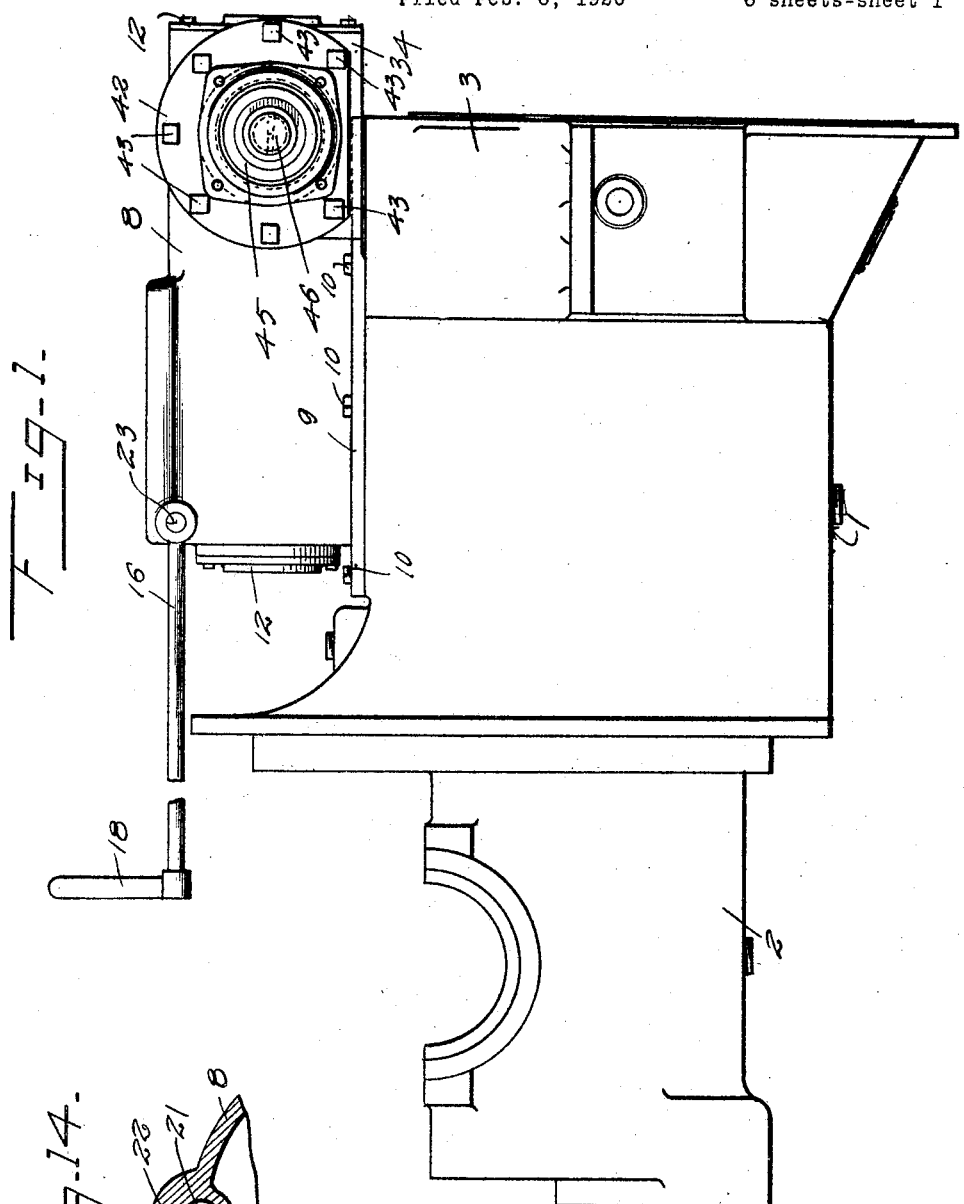

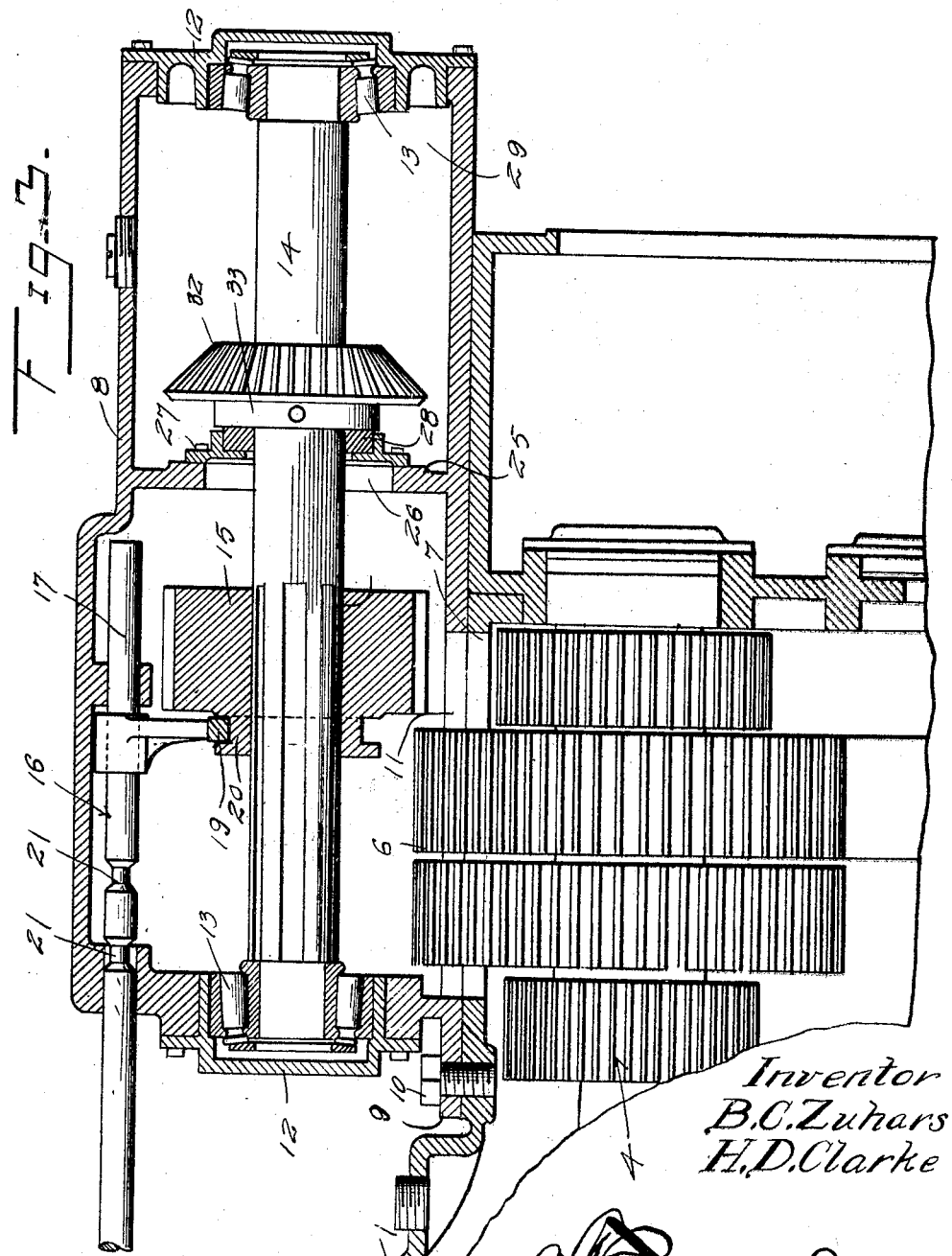

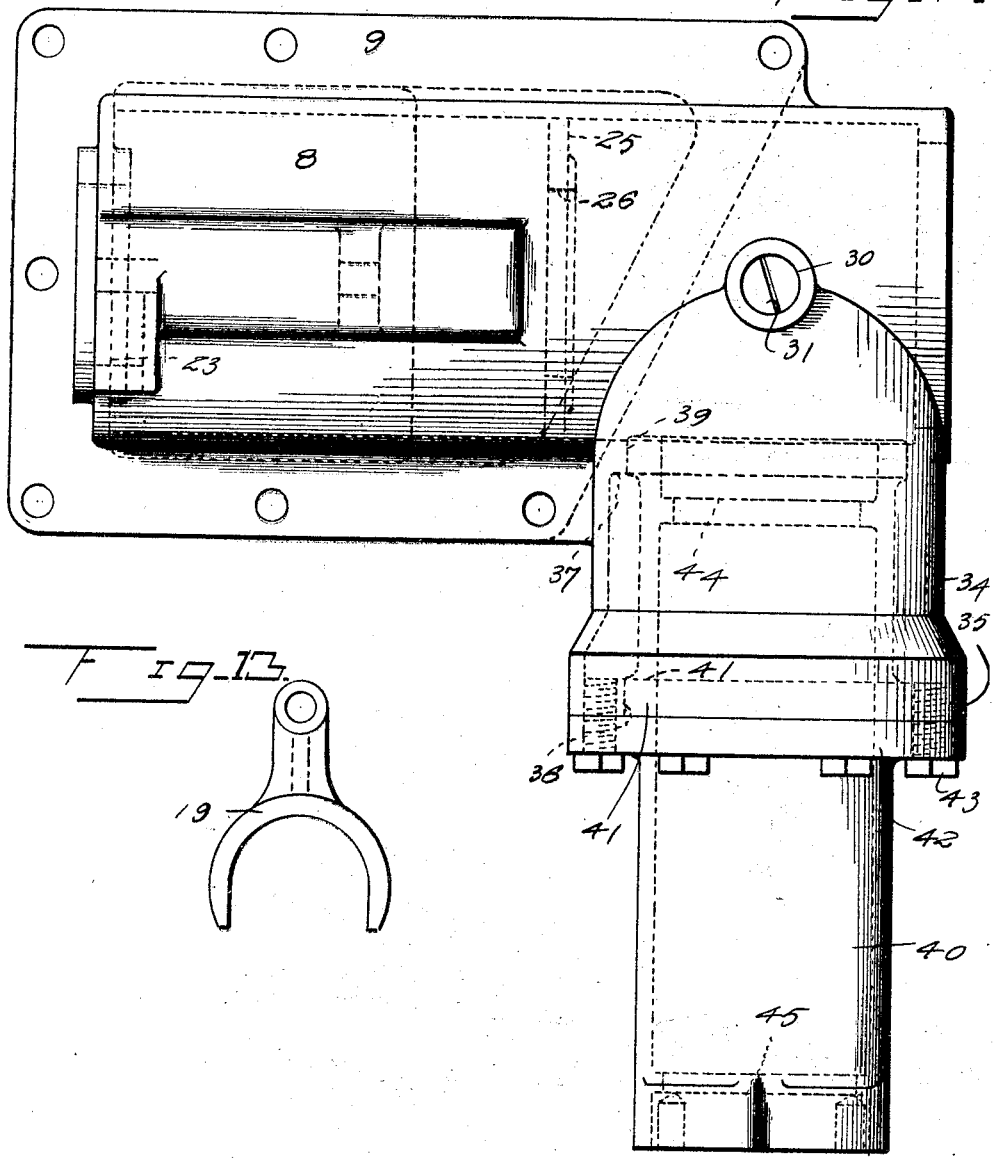

Mar. 27, 1923.
B. C. ZUHARS ET AL
1,449,572
POWER TAKE-OFF
Filed Feb. 6, 1920
6 sheets-sheet 5
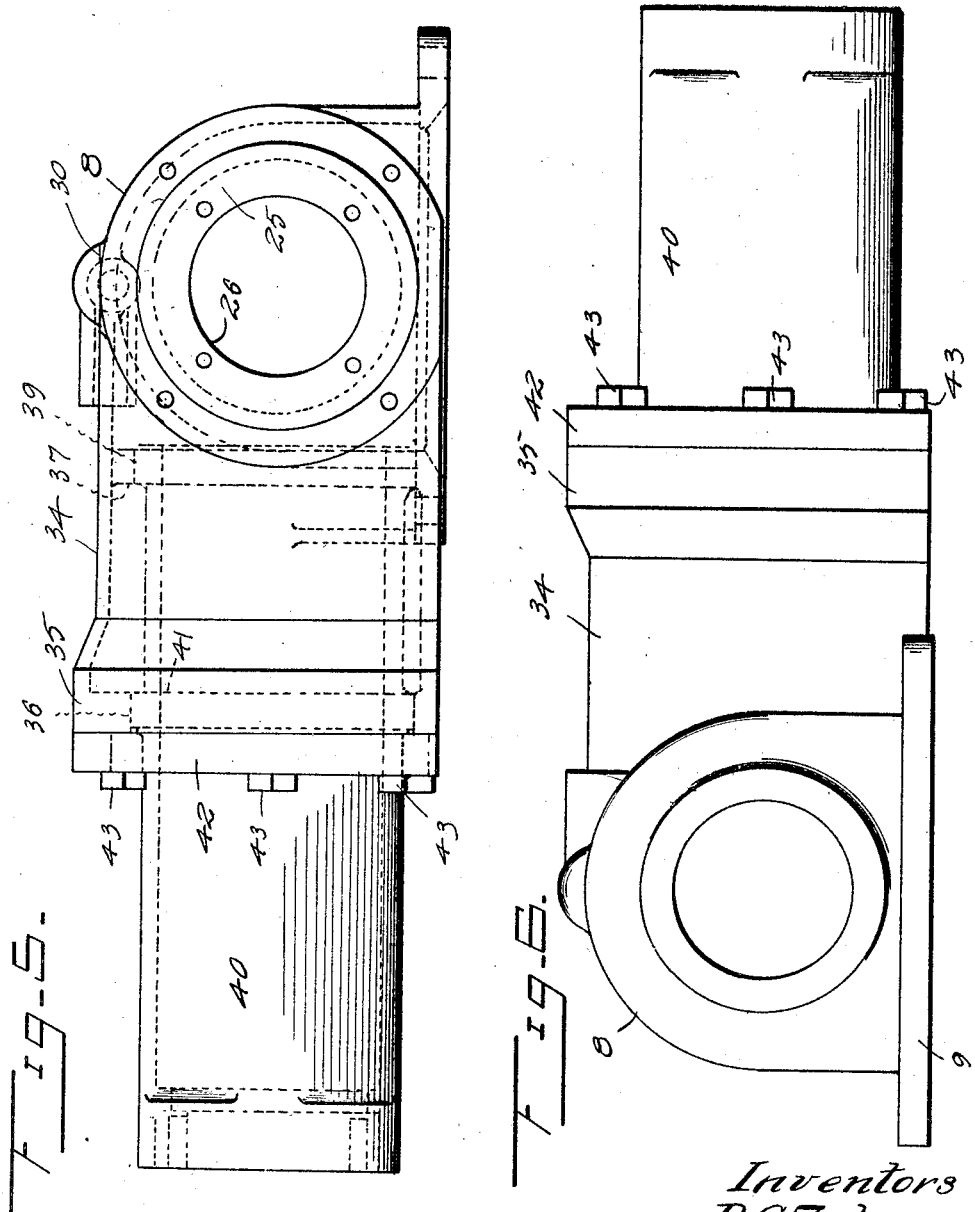
Inventors
B.C. Zuhars
H.D. Clarke
By [signature] Atty Mar. 27, 1923.
B. C. ZUHARS ET AL
1,449,572
POWER TAKE-OFF
Filed Feb. 6, 1920   6 sheets-sheet 6
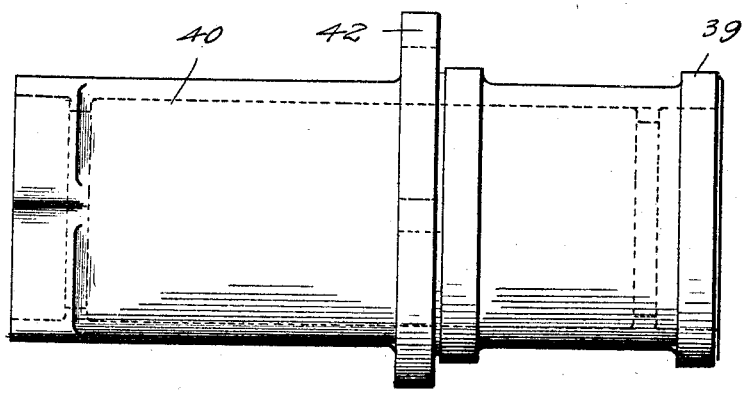
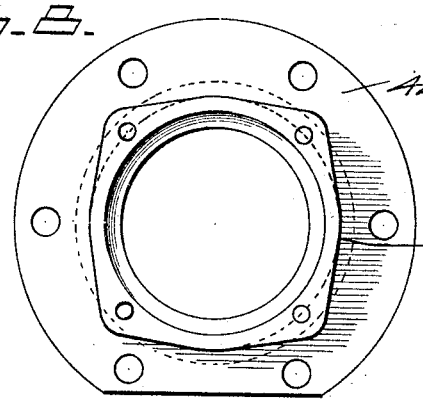
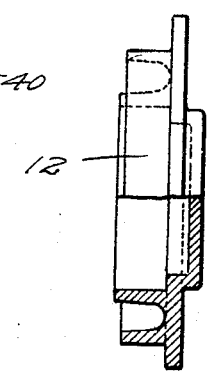
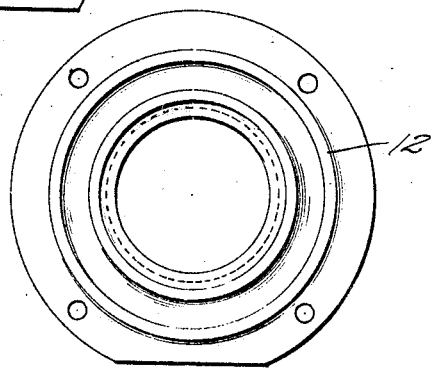
Inventors
B.C. Zuhars
H.D. Clarke Patented Mar. 27, 1923.

1,449,572

UNITED STATES PATENT OFFICE.

BENJAMIN C. ZUHARS AND HARRY D. CLARKE, OF GRAND VIEW HEIGHTS, COLUMBUS, OHIO, ASSIGNORS TO THE OHIO TRACTOR COMPANY, OF COLUMBUS, OHIO, A CORPORATION OF OHIO.

POWER TAKE-OFF.

Application filed February 6, 1920. Serial No. 356,745.

*To all whom it may concern:*

Be it known that we, BENJAMIN C. ZUHARS and HARRY D. CLARKE, citizens of the United States, residing at Grand View Heights, Columbus, in the county of Franklin and State of Ohio, have invented certain new and useful Improvements in Power Take-Offs; and we do hereby declare the following to be a full, clear, and exact description of the invention, such as will enable others skilled in the art to which it appertains to make and use the same.

This invention relates to new and useful improvements in power take-offs for tractors or motor vehicles and has for one of its objects the provision of means whereby power may be taken directly from an idle gear of a transmission and used for driving machinery from the power source of the tractor or motor vehicle.

Another object of this invention is the provision of a housing for supporting the pulley and power take-off shafts and which can be quickly and conveniently applied to a transmission and its housing and also position the pulley wheel at such point that it can be easily belted to machinery for the purpose of driving the same.

A further object of this invention is the provision of a power take-off of the above stated character which may be cheaply manufactured or machined and owing to its few parts may be easily and quickly assembled and installed on a tractor or motor vehicle.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings in which:

Figure 1 is a side elevation illustrating a power take-off constructed in accordance with our invention and illustrating the same applied to transmission and clutch housings, Figure 2 is a horizontal sectional view illustrating the mounting of the power take-off and pulley shafts and the driving connections between said shafts, Figure 3 is a vertical sectional view illustrating the connection between the power take-off shaft and the idle gear of the transmissions, Figure 4 is a plan view illustrating the power take-off housing, Figure 5 is an end view looking at one end of the housing, Figure 6 is a similar view looking at the other end of the housing, Figure 7 is a side elevation illustrating an auxiliary casing or casting for receiving the pulley shaft, Figure 8 is an end view looking at one end of the casing or casting, Figure 9 is a plan view illustrating a bearing-cap, Figure 10 is an edge elevation partly in section illustrating said bearing cap, Figure 11 is a similar view illustrating a leak-proof cap for the power take-off shaft, Figure 12 is a plan view of the same, Figure 13 is a front elevation illustrating a shifting fork, Figure 14 is a detail sectional view illustrating a locking pin for the shifting rod.

Referring in detail to the drawings, the numeral 1 indicates a transmission housing having formed integrally with its rear end a differential hanger 2 and has secured to its front end a clutch housing 3. The transmission housing 1 has a transmission 4 located therein and the counter-shaft 5 thereof has journaled thereon an idle gear 6 continuously driven by said transmission 4, and which extends through an opening 7 formed in the top wall of said transmission housing 1. The heretofore described parts form subject matter for co-pending applications.

A power take-off housing 8 is seated on the top of the transmission and clutch housings and is provided with a lateral flange 9 which is detachably secured to said housing by fasteners 10 and is provided with an opening 11 in registration with the opening 7 of the transmission housing so as to permit the idle gear 6 to extend into the power take-off housing 8. The power take-off housing 8 projects forwardly of the clutch housing 3 and has openings in each end closed by adjustable bearing caps 12. The bearing caps 12 are adjustable within said openings from the exterior of the power take-off housing 8 and have bearings 13 therein to rotatably support the end of a power take-off shaft 14. A shifting gear 15 is slidably secured to the power take-off shaft 14 and is adapted to be moved into and out of mesh with the idle gear 6 by a controlling means 16 thereby providing a construction wherein the power take-off shaft can be driven by the transmission 4 at any time desired. Moreover the idler 16 being continuously engaged with the transmission will quickly come to rest and consequently the shifting gear 15 will not have to mesh with a free spinning gear. The controlling means 16 include a rod 17 slidably mounted in the upper portion of the power take-off housing 8 and extending exteriorly and rearwardly of said housing and provided with a handle 18. A fork 19 is secured to the rod 17 and engages a grooved collar 20 formed integrally with the shifting gear 15. The rod 17 is provided with spaced grooves 21 to be engaged by a spring actuated plunger 22 located in a socket 23 of the housing 8 for the purpose of locking the shifting gear 15 into and out of mesh with the idle gear 6. The plunger 22 is held within the recess 23 by means of a plug 24 which is threaded into said recess from the exterior of the housing 8 providing a construction wherein the tension of the spring of said plunger 22 can be adjusted from the exterior of the housing 8.

A wall 25 is formed in the power take-off housing 8 and is provided with an opening 26 to permit the power take-off shaft 14 to extend therethrough and a leak-proof cap 27 is secured to said wall and is provided with a packing 28 which engages the power take-off shaft 14 for the purpose of establishing a leak-proof connection between the shaft and the wall 25. This connection between the power take-off shaft and the housing 8 provides a lubricant compartment 29 in the forward end of said housing 8 adapted to be partially filled with lubricant by way of a port 30 closed by a removable plug 31.

A miter gear 32 is secured to the forward end of the power take-off shaft 14 and is located in the chamber 29 and has its hub 33 disposed against the packing 28 for the purpose of holding said packing in place. It is to be noted that by adjusting the bearings 13 at each end of the power take-off housing 8 will also adjust the hub 33 of the miter gear 32 against the packing thereby taking up any wear that may have occurred in said packing.

A lateral branch 34 is formed on the forward portion of the power take-off housing 8 and has communication with the chamber 29 and has its end flared as illustrated at 35 and provided with an internal flange 36. An internal flange 37 is formed in the lateral branch 34 at a point of its formation to the housing 8 and is adapted to receive a flange 39 formed on the inner end of a casting or sleeve 40 which is positioned within the lateral branch 34 and is provided with a flange 41 which fits within the flange 36. An attaching flange 42 is formed on the casting or sleeve 40 and abuts the flared end 35 of the lateral casting 34 and is secured thereto by fasteners 43 providing a construction wherein the casting or sleeve 40 may be easily and conveniently removed and replaced in said lateral branch 34.

Bearings 44 and 45 are located in the ends of the casting or sleeve 40 and rotatably support a pulley shaft 46 which extends into the chamber 29 and has secured thereto a miter gear 47 that meshes with the miter gear 32 so that said pulley shaft 46 is rotated by the power take-off shaft 14. The hub of the miter gear 47 abuts the bearing 44 while the hub 48 of a pulley 49 abuts the bearing 45 and said pulley is splined to the outer end of the pulley shaft 46 and is further secured thereon by a nut 50 threaded onto the end of said shaft. By adjusting the nut on said shaft 46, the wear in the bearings 45 and 44 can be easily taken up.

A leak-proof cap 51 is secured to the outer end of the casting or sleeve 40 and is provided with a packing 52 to prevent the escape of lubricant from the casting or sleeve.

While we have shown and described the preferred embodiment of our invention, it will be understood that minor changes in construction, combination, and arrangement of parts may be made without departing from the spirit and scope of the invention as claimed.

Having thus described our invention what we claim is:

1. The combination with transmission and clutch housings and a transmission having a driven idle gear, of a power take-off housing secured to said transmission and clutch housings, a power take-off shaft journaled in said housing, means driving said shaft by the idle gear, and means delivering power from the power take-off shaft to other machinery.

2. The combination with transmission and clutch housings and a transmission, an idle gear driven by the transmission and located in the transmission housing, a power take-off housing secured to the transmission and clutch housing, said power take-off and transmission housing having alining openings for the idle gear to extend into the power take-off housing, a power take-off shaft journaled in said power take-off housing, a shifting gear on said power take-off shaft, means moving the shifting gear into and out of mesh with the idle gear, and means delivering power from said shaft to other machinery.

3. A power take-off comprising a housing, a power take-off shaft journaled in said housing, means for rotating said shaft, a lateral casting formed on said housing, a sleeve secured in said lateral casting and projecting beyond the end thereof, and a pulley shaft journaled in said sleeve and connected with the power take-off shaft.

4. A power take-off comprising a housing, adjustable bearings at each end of said housing, a power take-off shaft journaled in said bearings, means for rotating said shaft, a lubricating compartment formed in said housing, a lateral casting formed on said housing and having communication with the lubricating compartment, a pulley shaft connected to the power take-off shaft and extending through the lateral casting, and means rotatably supporting the pulley shaft.

5. A power take-off comprising a housing, a power take-off shaft adjustable lengthwise of said housing, a wall formed in said housing for forming a lubricant compartment and having an opening to receive said shaft, a leak-proof connection between the shaft and said wall, a pulley shaft journaled in said housing, a gear secured to the power take-off shaft and engaging said means, and a gear secured to the pulley shaft and in mesh with the first named gear.

6. A power take-off comprising a housing, a power take-off shaft journaled in said housing, a lubricant compartment formed in said housing, a lateral casting formed on said housing and in communication with said compartment, a sleeve detachably secured in said lateral casting, a pulley shaft journaled in said sleeve and connected to the power take-off shaft, a leak-proof connection between the end of the sleeve and the pulley shaft, and a pulley secured to the pulley shaft and adapted to be adjusted against said leak-proof connection.

7. A power take-off comprising a housing, a power take-off shaft journaled in said housing, a lateral casting formed on said housing and having spaced internal flanges, a sleeve having spaced external flanges seating in the internal flanges and detachably secured to said lateral casting and projecting beyond the end thereof, a gear secured to the power take-off shaft, bearings carried by said sleeve for rotatably supporting the pulley shaft, a gear secured to the pulley shaft and in mesh with the first named gear, a leak-proof connection between the sleeve and the pulley shaft, and a belt pulley adjustably secured to the pulley shaft and adapted to engage the leak-proof connection.

8. The combination, with transmission and clutch housings and a transmission having a continuously driven idle gear, of a detachable power take-off housing, means for detachably securing said housing to said transmission and clutch housings at a point above the said idle gear, a power take-off shaft journaled in said power take-off housing, means driving said shaft by said idle gear, and means delivering power from the power take-off shaft to other machinery.

In testimony whereof we affix our signatures in presence of two witnesses.

BENJAMIN C. ZUHARS.
HARRY D. CLARKE.

Witnesses:
JAMES F. LANGHEAD,
JOSEPH MORRIS.